US005557457A

United States Patent [19]

Esperti

[11] Patent Number: 5,557,457

[45] Date of Patent: Sep. 17, 1996

[54] FOLDING BINOCULAR APPARATUS AND BINOCULAR BLANK

[76] Inventor: Anthony Esperti, 9863 SW. 138th Ave., Miami, Fla. 33186

[21] Appl. No.: 279,534

[22] Filed: Jul. 25, 1994

[51] Int. Cl.[6] .......... G02B 7/02; G02B 23/18; G02B 23/20

[52] U.S. Cl. .......... 359/408; 359/407; 359/480

[58] Field of Search .......... 359/408, 407, 359/474, 817, 406, 819, 827, 480

[56] References Cited

U.S. PATENT DOCUMENTS

| | | | |
|---|---|---|---|
| 4,239,328 | 12/1980 | Justice, Sr. et al. | 359/408 |
| 4,268,111 | 5/1981 | Green et al. | 359/408 |
| 4,478,498 | 10/1984 | Ohno | 359/480 |
| 4,773,747 | 9/1988 | Bresnahan | 359/408 |
| 4,913,541 | 4/1990 | Wakayama et al. | 359/408 |
| 5,353,151 | 10/1994 | Schultz et al. | 359/474 |

FOREIGN PATENT DOCUMENTS

| | | | |
|---|---|---|---|
| WO85/01121 | 3/1985 | WIPO | 359/480 |

*Primary Examiner*—Thong Nguyen
*Assistant Examiner*—Mohammad Y. Sikder
*Attorney, Agent, or Firm*—Robert J. Van Der Wall

[57] ABSTRACT

A binocular apparatus body blank of sheet material and divided by fold lines includes a distal wall having a pair of spaced apart objective lens ports and two opposing lateral edges; a bottom wall extending from an edge of the distal wall and having a lateral fold line to permit the apparatus body to collapse; a top wall extending from an opposing edge of the distal wall and having a lateral fold line to permit the apparatus body to collapse; a proximal wall having an outer face and two opposing lateral edges and having a pair of spaced apart eyepiece ports and extending from an edge of said top wall opposite the distal wall; a bonding flap extending from an edge of the proximal wall opposite the top wall for bonding to the remote longitudinal edge of the bottom wall; two side walls extending from the opposing lateral edges of the distal wall, each side wall having a remote end and a lateral fold line to permit the side walls to collapse simultaneously with and top and bottom walls; and a side wall bonding section at each remote end for bonding to the outer face of the proximal wall at each the opposing lateral edge of the proximal wall. The apparatus preferably includes a nose receiving opening cut into the proximal and bottom walls, and a carrying cord port in each side wall; and a carrying cord secured within the ports.

2 Claims, 4 Drawing Sheets

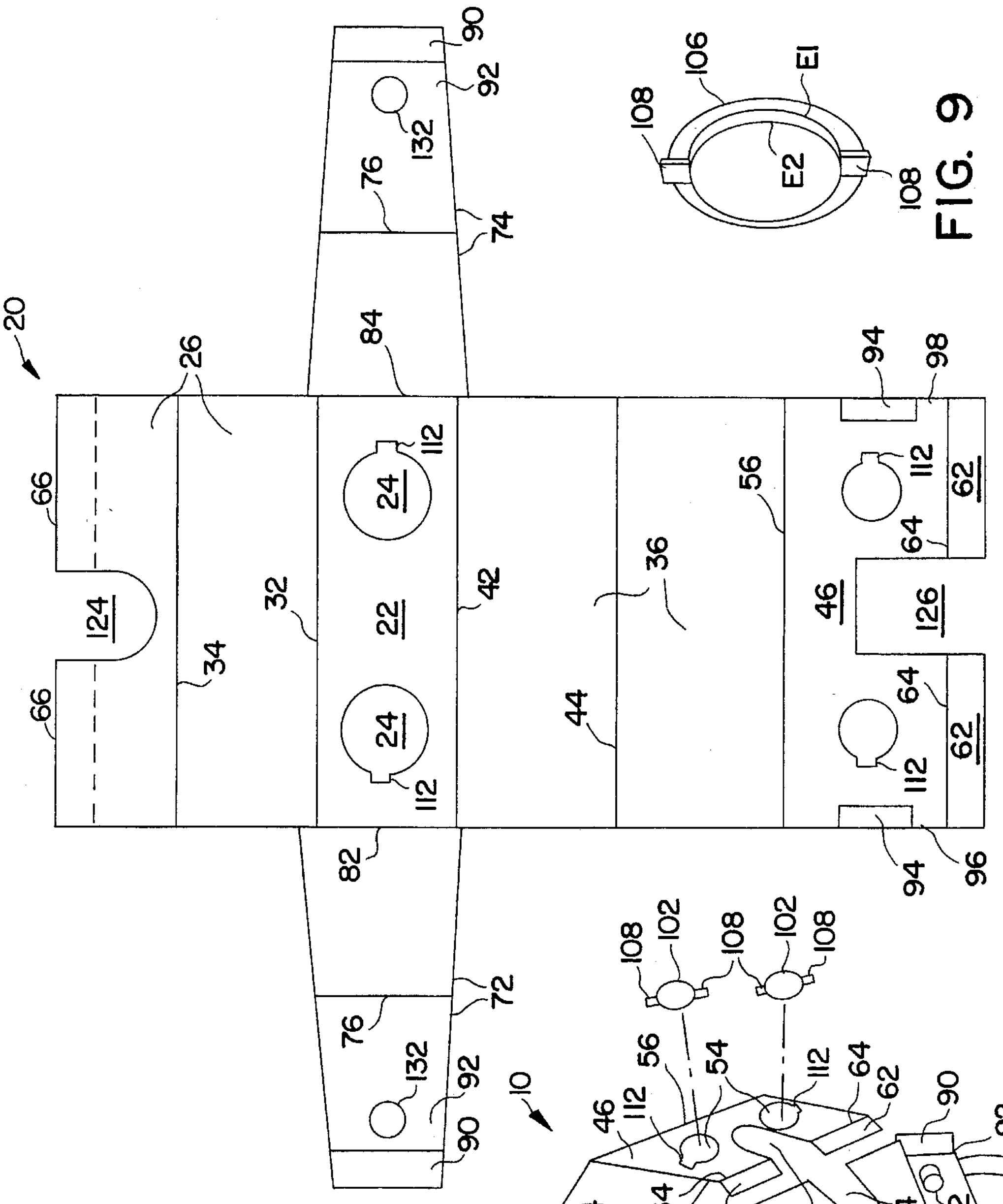
FIG. 8
FIG. 9
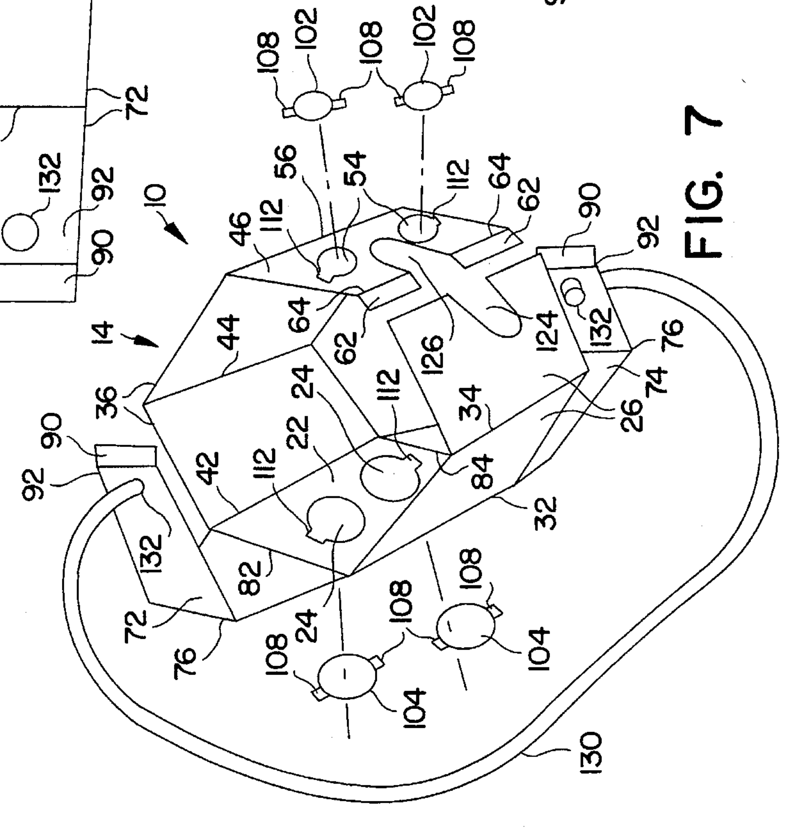
FIG. 7

FOLDING BINOCULAR APPARATUS AND BINOCULAR BLANK

BACKGROUND OF THE INVENTION

1. Field of the Invention

The present invention relates generally to the field of binoculars and other viewing devices. More specifically, it relates to a foldable binocular apparatus which collapses into a flat configuration for convenient storage in a plastic pocket case. The apparatus includes a body formed from a blank of flexible, resilient sheet material divided by fold lines into several regions including a distal wall having a pair of longitudinally spaced-apart objective lens ports. A bottom wall extends from a longitudinal edge of the distal wall and has a lateral fold line to permit the body to collapse for apparatus focusing and for storage. A top wall extends from an opposing longitudinal edge of the distal wall and has a lateral fold line to also permit the body to collapse. A proximal wall extends from an edge of the top wall opposite the distal wall and has a pair of longitudinally spaced-apart eyepiece ports. A bonding flap extends from a longitudinal edge of the proximal wall opposite the top wall for bonding to the remote longitudinal edge of the bottom wall during apparatus assembly. Two light blocking side walls extend from opposing lateral edges of the distal wall, each side wall having a central lateral fold line to permit the side wall to collapse simultaneously with the top and bottom walls during apparatus focusing and storing. Each side wall has a bonding tab at its remote end to bond to a bonding section on the outer face of the proximal wall at each proximal wall lateral edge. Eyepieces and objective lenses each have a radial flange along one perimetrical edge and a pair of opposing radial tabs along the other perimetrical edge. The eyepieces and objective lenses are fit into their respective ports, and the tabs fit through port edge notches and then rotate out of alignment with the port notches. The assembled apparatus includes a binocular body which collapses at the fold lines in the manner of a bellows to permit the proximal and distal walls to move toward and away from each other to focus the apparatus for an infinite variety of viewing distances, and to collapse into a flat storage configuration to fit into a storage and carrying envelope. The apparatus optionally includes a nose receiving opening cut into the proximal and bottom walls midway between the eyepieces.

2. Description of the Prior Art

There have long been binocular devices formed of blanks of sheet material for assembly into functioning binocular units. These prior devices have generally either not been capable of adjustable focusing for varying viewing distances, or have been structurally weak or complex and difficult to assemble.

Green, et al., U.S. Pat. No. 4,268,111, issued on May 19, 1981, discloses foldable binoculars having a case formed of sheet material. Green includes a rear wall having ports in which two eyepieces are mounted, and a front wall having ports in which two objective lenses are mounted. The front and rear walls are joined together by collapsible case walls which buckle at central, lateral fold lines for focusing and storage. A pair of interconnecting V-shaped openings in the rear and bottom walls permit relative lateral movement of the eyepieces to accommodate users of various eye spacings. A problem with Green et al. is that the blank from which the case is formed has numerous and redundant folding sections, making assembly puzzling and complicated. See Prior Art FIGS. 1 and 2. The eyepiece ports are each formed from the overlap of three mutually registering ports in separate blank wall sections located at three extremities of the blank, causing confusion, complication and a potential for error during assembly of the unit.

Rice, U.S. Pat. No. 4,846,553, issued on Jul. 11, 1989, teaches a foldable stereoscopic viewer for insertion as a disassembled blank into a pocket in a publication, such as a magazine or book. An anchor section of the blank fits into the pocket to removably retain the viewer within the publication. The viewer is assembled by the publication reader into a bellows-like structure similar to that of Green, except that the side walls are formed of two sections 100 and 122, and 96 and 118, connected together at the central side wall fold area. See Prior Art FIGS. 3 and 4. A problem with this construction is that the side walls bend most at the central fold line where the sections are bonded together, increasing the likelihood of bond failure and disconnection. This construction is inherently weak and unreliable.

Hoeptner, U.S. Pat. No. 4,964,709, issued on Oct. 23, 1990, reveals a foldable. binocular device. The Hoeptner device is much like that of Green, except that a visor portion protrudes over the upper edge of the front wall. A problem with Hoeptner is that the blank from which it is assembled is complex and confusing, having eyepiece and objective lens ports formed of multiple registering openings. The blank is also of weak design because the side walls are each joined to the rest of the blank by only two very narrow connecting links. These side walls could break away during assembly and be damaged or lost.

Ohno, U.S. Pat. No. 4,478,498, issued on Oct. 23, 1984, discloses a foldable binocular assembly constructed from a blank. The blank folds into a box-like body having a pair of eyepieces mounted in ports in a rear wall and a pair of objective lenses mounted in ports in a front wall. Ohno folds flat for storage in a carrying case. A problem with Ohno that the box body apparently does not contract or collapse to permit variable focusing for different viewing distances. If Ohno did collapse in the manner of Rice, the side walls would be subject to failure because they are formed of two joined side sections meeting at the centered, fold line area.

Bresahan, U.S. Pat. No. 4,773,747, issued on Sep. 27, 1988, teaches a foldable binocular and binocular blank. It is not clear from the disclosure whether Bresahan is intended to vary its focus by folding or whether it simply folds to collapse for storage. If Bresahan does not have variable focus, this omission limits its usefulness; and if it does fold to vary focus, the structure is weak as in Ohno because the side walls are joined at the fold line from separate side sections.

Justice, Sr. et al., U.S. Pat. No. 4,239,328, issued on Dec. 16, 1980, discloses a collapsible binocular and binocular blank. Justice folds to form a box-shaped binocular body of fixed optical length. The problems of Justice are essentially those of Bresahan.

Riley, U.S. Pat. No. 4,013,341, issued on Mar. 22, 1977, reveals a collapsible binocular instrument having two spaced-apart and interconnected telescoping tube portions. The instrument collapses into a flat configuration for carrying and storage. An ocular lens is inserted into one end of each telescoping portion and an objective lens is inserted into the other end. A problem with Riley is that two blanks are required to construct it, one for each telescoping section of the tube portions. This multiples production equipment requirements and complicates assembly. Another problem is that the lenses must be removed when the instrument is collapsed for carrying and storage, and thus there is the inconvenience of reinserting them for each use.

Harlow, U.S. Pat. No. 2,071,120, issued on Feb. 16, 1937, teaches a magnifying and viewing device for viewing strips of film. A problem with Harlow if used as a binocular body is that it is of fixed optical length, and thus not capable of focusing for varied viewing distances. The Harlow body structure, moreover, does not lend itself to bellows-like collapsing for focusing because the box corners along connecting side edges do not all separate to bow apart from each other.

It is thus an object of the present invention to provide a collapsible binocular apparatus which is formed from a blank which is simple and easy to assemble.

It is another object of the present invention to provide such an apparatus which is sturdy and capable of prolonged and repeated manipulation and collapse without structural failure.

It is still another object of the present invention to provide an apparatus which fits into a carrying case and has a neck strap for convenient access such as at sporting and cultural events.

It is finally an object of the present invention to provide such an apparatus which is inexpensive to manufacture.

SUMMARY OF THE INVENTION

The present invention accomplishes the above-stated objectives, as well as others, as may be determined by a fair reading and interpretation of the entire specification.

A binocular apparatus body blank of sheet material is provided and divided by fold lines to include a distal wall having a pair of spaced apart objective lens ports and two opposing lateral edges; a bottom wall extending from an edge of the distal wall and having a lateral fold line to permit the apparatus body to collapse; a top wall extending from an opposing edge of the distal wall and having a lateral fold line to permit the apparatus body to collapse; a proximal wall having an outer face and two opposing lateral edges and having a pair of spaced apart eyepiece ports and extending from an edge of the top wall opposite the distal wall; a bonding flap extending from an edge of the proximal wall opposite the top wall for bonding to the remote longitudinal edge of the bottom wall; two side walls extending from the opposing lateral edges of the distal wall, each side wall having a remote end and a lateral fold line to permit the side walls to collapse simultaneously with top and bottom walls; and a side wall bonding section at each remote end for bonding to the outer face of the proximal wall at each the opposing lateral edge of the proximal wall. The apparatus preferably includes a nose receiving opening cut into the proximal and bottom walls, and a carrying cord port in each side wall; and a carrying cord secured within the ports.

The apparatus preferably additionally includes at least one objective lens having a radial flange along a perimetrical edge of the at least one objective lens and at least one tab projecting from an opposing perimetrical edge of the at least one objective lens and spaced apart from the flange, and where the at least one port has a port edge and a tab receiving notch in the port edge, so that the lens may be inserted into the at least one port and the tab may be simultaneously inserted into the tab receiving notch, and so that the lens may then be rotated relative to the at least one objective lens port so that the tab does not register with the notch and so that the port edge is retained between the tab and the flange.

The apparatus preferably additionally includes at least one eyepiece having a radial flange along a perimetrical edge of the at least one eyepiece and at least one tab projecting from an opposing perimetrical edge of the at least one eyepiece and spaced apart from the flange, and where the at least one port has a port edge and a tab receiving notch in the port edge, so that the lens may be inserted into the at least one port and the tab may be simultaneously inserted into the tab receiving notch, and so that the lens may then be rotated relative to the at least one eyepiece port so that the tab does not register with the notch and so that the port edge is retained between the tab and the flange.

BRIEF DESCRIPTION OF THE DRAWINGS

Various other objects, advantages, and features of the invention will become apparent to those skilled in the art from the following discussion taken in conjunction with the following drawings, in which:

Prior Art

Prior Art

Prior Art

Prior Art

FIG. 7 is a perspective view of the apparatus being bent into the assembled configuration from the blank; and FIG. 8 and 9 are plan views of the inventive viewer apparatus blank, with the carrying cord omitted.

DETAILED DESCRIPTION OF THE PREFERRED EMBODIMENTS

Figure 2:
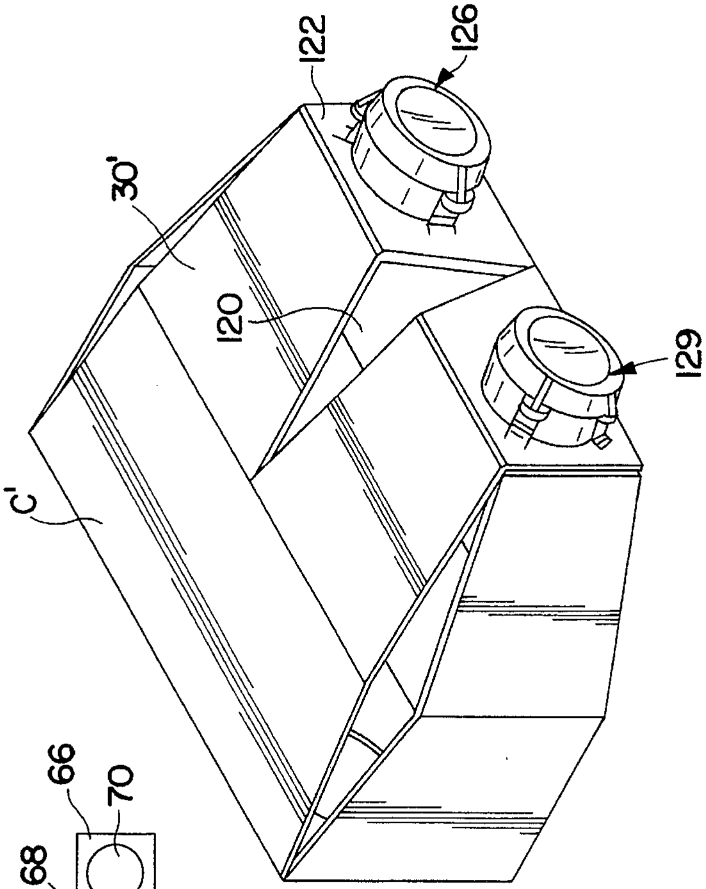
FIG. 2 is a perspective view of the viewer assembled from the blank of Prior Art FIG. 1.
Figure 1:
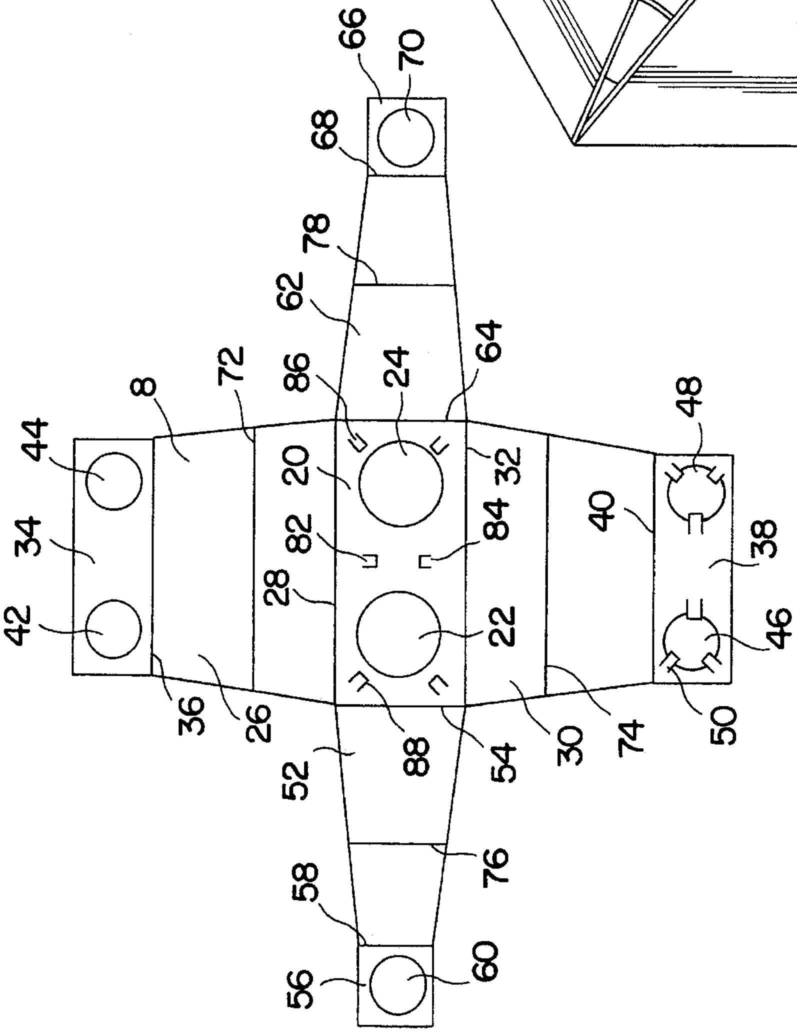
FIG. 1 is a plan view of a first prior art blank.
Figure 3:
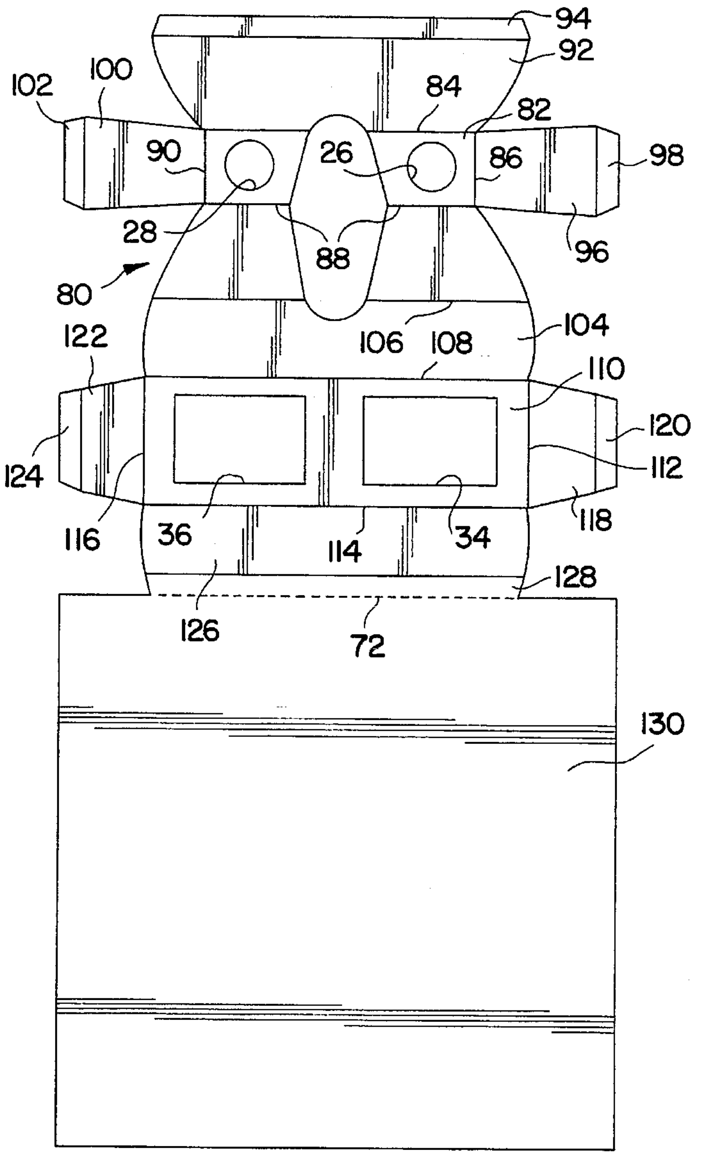
FIG. 3 is a plan view of a second prior art blank.
Figure 4:
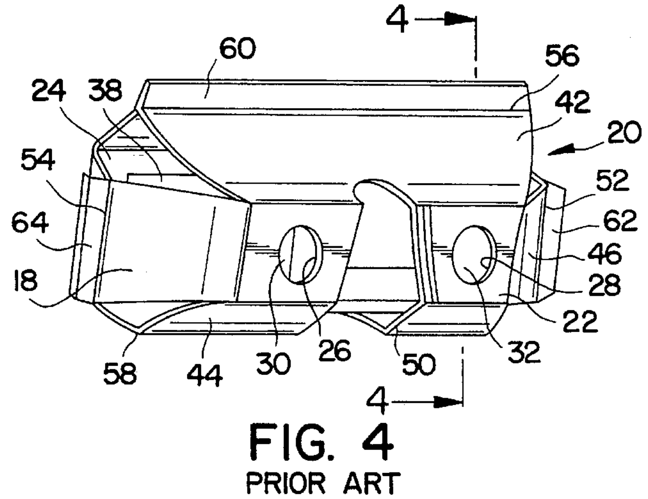
FIG. 4 is a perspective view of the viewer assembled from the blank of Prior Art FIG. 3.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 5:
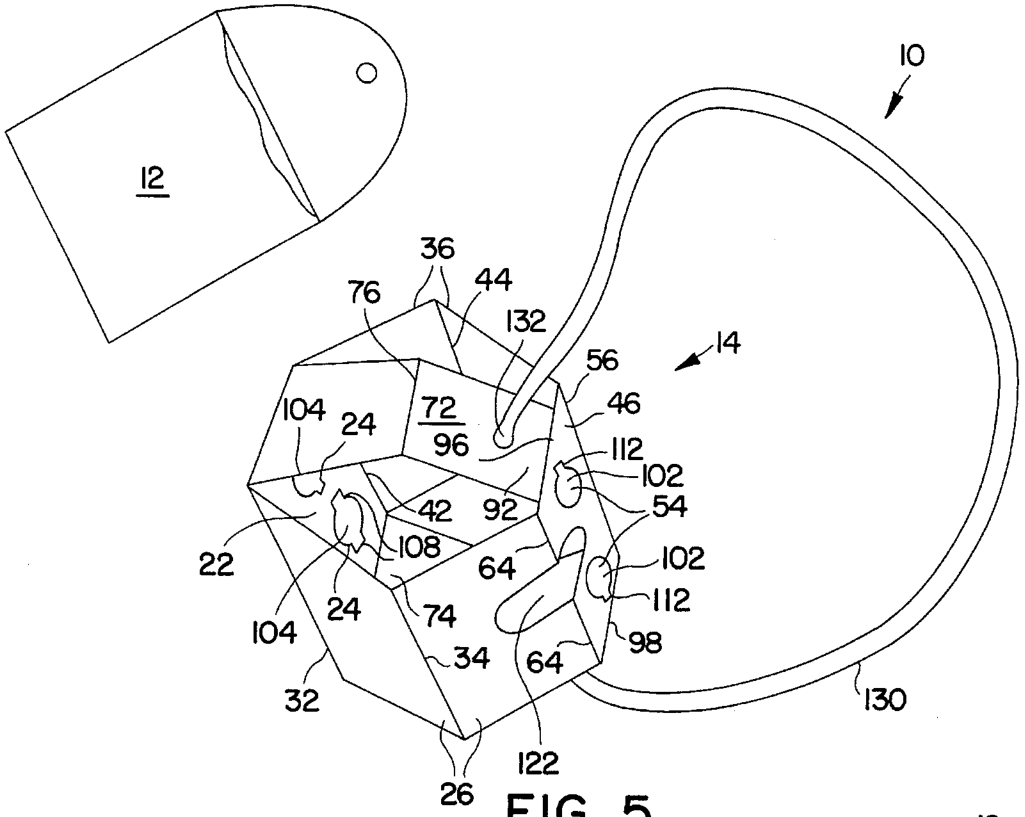
FIG. 5 is a perspective view of the viewer of the present invention assembled and ready for use, shown together with the pocket carrying case.
Figure 6:
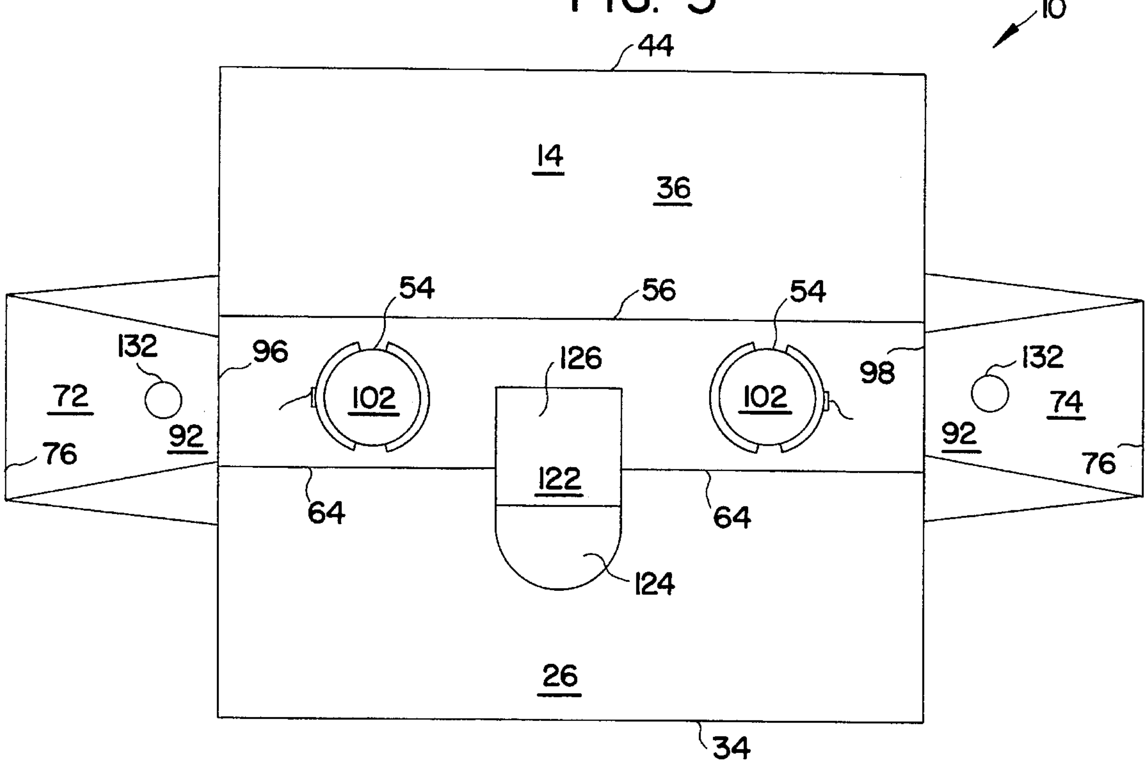
FIG. 6 is a front view of the apparatus in the folded, storage configuration, ready for insertion into the carrying case of FIG. 5, with the carrying cord omitted.

Referring to FIGS. 5–9, a foldable binocular apparatus 10 is disclosed. Apparatus 10 collapses and expands at fold lines to alter the distance between eyepieces and objective lenses for focusing images at an infinite variety of viewing distances. Apparatus 10 also collapses into a flat configuration for convenient storage in a plastic pocket case 12. See FIGS. 5 and 6. Apparatus 10 has a binocular body 14 formed from a blank 20 of flexible, resilient sheet material, such as a suitable plastic. See FIGS. 7 and 8.

Blank 20 is divided by fold lines into several wall portions including a distal wall 22 having a pair of longitudinally spaced-apart objective lens ports 24. See FIG. 8. A bottom wall 26 extends from a fold line 32 at a longitudinal edge of distal wall 22 and has a central lateral fold line 34 to permit the body 14 to collapse for apparatus 10 focusing and storage. A top wall 36 extends from a fold line 42 at an opposing longitudinal edge of distal wall 22 and has a central lateral fold line 44 to once again permit body 14 to collapse. A proximal wall 46 extends from a fold line 56 at an edge of top wall 36 opposite distal wall 22 and has a pair of longitudinally spaced-apart eyepiece ports 54. A bonding flap 62 extends from a fold line 64 at a longitudinal edge of proximal wall 46 opposite top wall 36 for bonding to the remote longitudinal edge 66 of bottom wall 26. Two side walls 72 and 74 extend from fold lines 82 and 84 at opposing lateral edges of distal wall 22. Each side wall 72 and 74 has a central lateral fold line 76 to permit side walls 72 and 74 to collapse simultaneously with top and bottom walls 36 and 26 during apparatus 10 focusing and storing. Each side wall 72 and 74 has a bonding tab 90 at its remote end 92 to bond to a bonding section 94 on the outer face of proximal wall 46 at each proximal wall lateral edge 96 and 98. See FIGS. 7 and 8.

Eyepieces 102 and objective lenses 104 each have a radial flange 106 along one perimetrical edge E1 and a pair of opposing radial tabs 108 along the other perimetrical edge E2. See FIG. 9. Eyepieces 102 and objective lenses 104 are fit into their respective ports 54 and 24. Tabs 108 are fit one at a time through port edge notches 112 and then rotated out of alignment with the port edge notches 112. As a result, the edge of the given port is retained between flange 106 and tabs 108.

The assembled apparatus 10 includes binocular body 14 which collapses in the manner of a bellows to permit the proximal and distal walls 46 and 22 to move toward and away from each other to focus apparatus 10' for an infinite variety of viewing distances. Although top wall 36, bottom wall 26, and two side walls 72 and 74 are not all structurally necessary for creating the bellows action, together they limit light entry into body 14 for clearer viewing. Body 14 also collapses into a flat storage configuration to fit into pocket case 12. See FIG. 6. Apparatus 10 optionally includes a nose receiving opening 122, formed of overlapping and contiguous cuts 124 and 126 in the proximal and bottom walls 46 and 26, respectively. A carrying strap or cord 130 preferably passes through cord holes 132 in side walls 72 and 74 and knotted at its ends to prevent release from holes 132. See FIG. 7.

While the invention has been described, disclosed, illustrated and shown in various terms or certain embodiments or modifications which it has assumed in practice, the scope of the invention is not intended to be, nor should it be-deemed to be, limited thereby and such other modifications or embodiments as may be suggested by the teachings herein are particularly reserved especially as they fall within the breadth and scope of the claims here appended.

I claim as my invention:

1. A binocular apparatus comprising:

two objective lenses two eyepieces;

a body blank of sheet material divided by fold lines comprising a distal wall having a pair of spaced apart objective lens ports and two opposing lateral edges; a bottom wall extending from an edge of said distal wall and having a lateral fold line to permit said apparatus body to collapse and having a remote longitudinal edge; a top wall extending from an opposing edge of said distal wall and having a lateral fold line to permit said apparatus body to collapse; a proximal wall having an outer face and two opposing lateral edge and having a pair of spaced apart eyepiece ports spaced apart from an adjacent said lateral edge a certain distance, and extending from an edge of said top wall opposite said distal wall; a proximal wall bonding flap extending from an edge of said proximal wall opposite said top wall for bonding to said remote longitudinal edge of said bottom wall; a side wall extending from each said opposing lateral edge of said distal wall, each said side wall having a remote end and a lateral fold line to permit said side walls to collapse simultaneously with top and bottom walls; a side wall bonding section at each said remote end for bonding to said outer face of said proximal wall at each said opposing lateral edge of said proximal wall, each said side wall bonding flap having a length of at most said certain distance such that said side wall bonding flaps do not obstruct said eyepiece ports and conserve said sheet material;

wherein at least one said objective lens comprises a radial flange along a perimetrical edge of said at least one said objective lens and at least one tab projecting from an opposing perimetrical edge of said at least one said objective lens and spaced apart from said flange;

and wherein said at least one objective lens port comprises a port edge and a tab receiving notch in said port edge;

such that said objective lens may be inserted into said at least one objective lens port and said tab may be simultaneously inserted into said tab receiving notch;

and such that rotation of said objective lens by a user relative to said at least one objective lens port to a position wherein said tab does not register with said notch retains said port edge between said tab and said flange and thus locks said objective lens into said at least one objective lens port.

2. A binocular apparatus comprising:

two objective lenses;

two eyepieces;

a body blank of sheet material divided by fold lines comprising a distal wall having a pair of spaced apart objective lens ports and two opposing lateral edges; a bottom wall extending from an edge of said distal wall and having a lateral fold line to permit said apparatus body to collapse and having a remote longitudinal edge; a top wall extending from an opposing edge of said distal wall and having a lateral fold line to permit said apparatus body to collapse; a proximal wall having an outer face and two opposing lateral edges and having a pair of spaced apart eyepiece ports spaced apart from an adjacent said lateral edge a certain distance, and extending from an edge of said top wall opposite said distal wall; a proximal wall bonding flap extending from an edge of said proximal wall opposite said top wall for bonding to said remote longitudinal edge of said bottom wall; a side wall extending from each said opposing lateral edge of said distal wall, each said side wall having a remote end and a lateral fold line to permit said side walls to collapse simultaneously with top and bottom walls; a side wall bonding section at each said remote end for bonding to said outer face of said proximal wall at each said opposing lateral edge of said proximal wall, each said side wall bonding flap having a length of at most said certain distance such that said side wall bonding flaps do not obstruct said eyepiece ports and conserve said sheet material;

wherein at least one said eyepiece comprises a radial flange along a perimetrical edge of said at least one said eyepiece and at least one tab projecting from an opposing perimetrical edge of said at least one said eyepiece and spaced apart from said flange;

and wherein said at least one eyepiece port comprises a port edge and a tab receiving notch in said port edge;

such that said eyepiece may be inserted into said at least one eyepiece port and said tab may be simultaneously inserted into said tab receiving notch;

and such that rotation of said eyepiece by a user relative to said at least one eyepiece port to a position wherein said tab does not register with said notch retains said port edge between said tab and said flange and thus locks said eyepiece into said at least one eyepiece port.

* * * * *